US006963945B2

(12) United States Patent
Pertry et al.

(10) Patent No.: US 6,963,945 B2
(45) Date of Patent: Nov. 8, 2005

(54) INTEGRATED CIRCUIT

(75) Inventors: Carl Roger Pertry, Hemmingen (DE); Christophe Gendarme, Antwerp (BE)

(73) Assignee: Alcatel, Paris (FR)

( * ) Notice: Subject to any disclaimer, the term of this patent is extended or adjusted under 35 U.S.C. 154(b) by 392 days.

(21) Appl. No.: 10/223,322

(22) Filed: Aug. 20, 2002

(65) Prior Publication Data

US 2003/0041196 A1 Feb. 27, 2003

(30) Foreign Application Priority Data

Aug. 21, 2001 (EP) .............................. 01440276

(51) Int. Cl.$^7$ ............................................. G06F 13/14
(52) U.S. Cl. ...................... 710/305; 710/104; 710/4; 710/9; 710/10; 713/1; 711/2; 718/104
(58) Field of Search ................. 710/3, 4, 8, 9, 710/10, 104, 305; 713/1; 718/104; 711/2

(56) References Cited

U.S. PATENT DOCUMENTS

| | | | | |
|---|---|---|---|---|
| 4,649,471 A | * | 3/1987 | Briggs et al. ................ | 711/211 |
| 5,175,822 A | * | 12/1992 | Dixon et al. .................... | 710/9 |
| 5,687,344 A | * | 11/1997 | Mitsuishi et al. ........... | 711/220 |
| 6,223,298 B1 | * | 4/2001 | Tellier et al. ................ | 713/501 |
| 6,434,690 B1 | * | 8/2002 | Ohsuga et al. ................ | 712/35 |
| 6,457,124 B1 | * | 9/2002 | Edwards et al. ............ | 713/100 |
| 6,687,773 B1 | * | 2/2004 | Stewart et al. ................ | 710/65 |

FOREIGN PATENT DOCUMENTS

| | | |
|---|---|---|
| EP | 0661637 A1 | 7/1995 |
| EP | 0803807 A2 | 10/1997 |
| WO | WO 0157676 A1 | 8/2001 |

OTHER PUBLICATIONS

ARM Inc., "AMBA APB SoC Infrastructure IP", ARM Inc., http://www.arm.com/products/solutions/AMBAAPB.html.*

Zhang Uing–Li et al., "The Design of AMBA/VCI Wrapper", IEEE, 5th International Conference, vol. 1 21–24, pp 438–442.*

* cited by examiner

Primary Examiner—Tim Vo
Assistant Examiner—Justin I. King
(74) Attorney, Agent, or Firm—Sughrue Mion, PLLC

(57) ABSTRACT

It is the object of the invention to optimise the allocation of address ranges to modules of an integrated circuit. Since according to the invention the address ranges in the address space are selectable through a central address management, the usage of the address space capacity can be optimised according to the current load factor. Flexible usage of the address space is enabled by choosing the position of the address range to be selected and the size of the address range. The address range can be assigned automatically by a software program. The software program is for example designed in such a way that it executes a fair distribution of the address ranges to the existing modules or those modules that currently need an address range. Provided there are no overlaps with other address ranges, the address ranges to be assigned can be chosen as wished. User-specific programming can be used to allocate specific address ranges to individual modules.

8 Claims, 1 Drawing Sheet

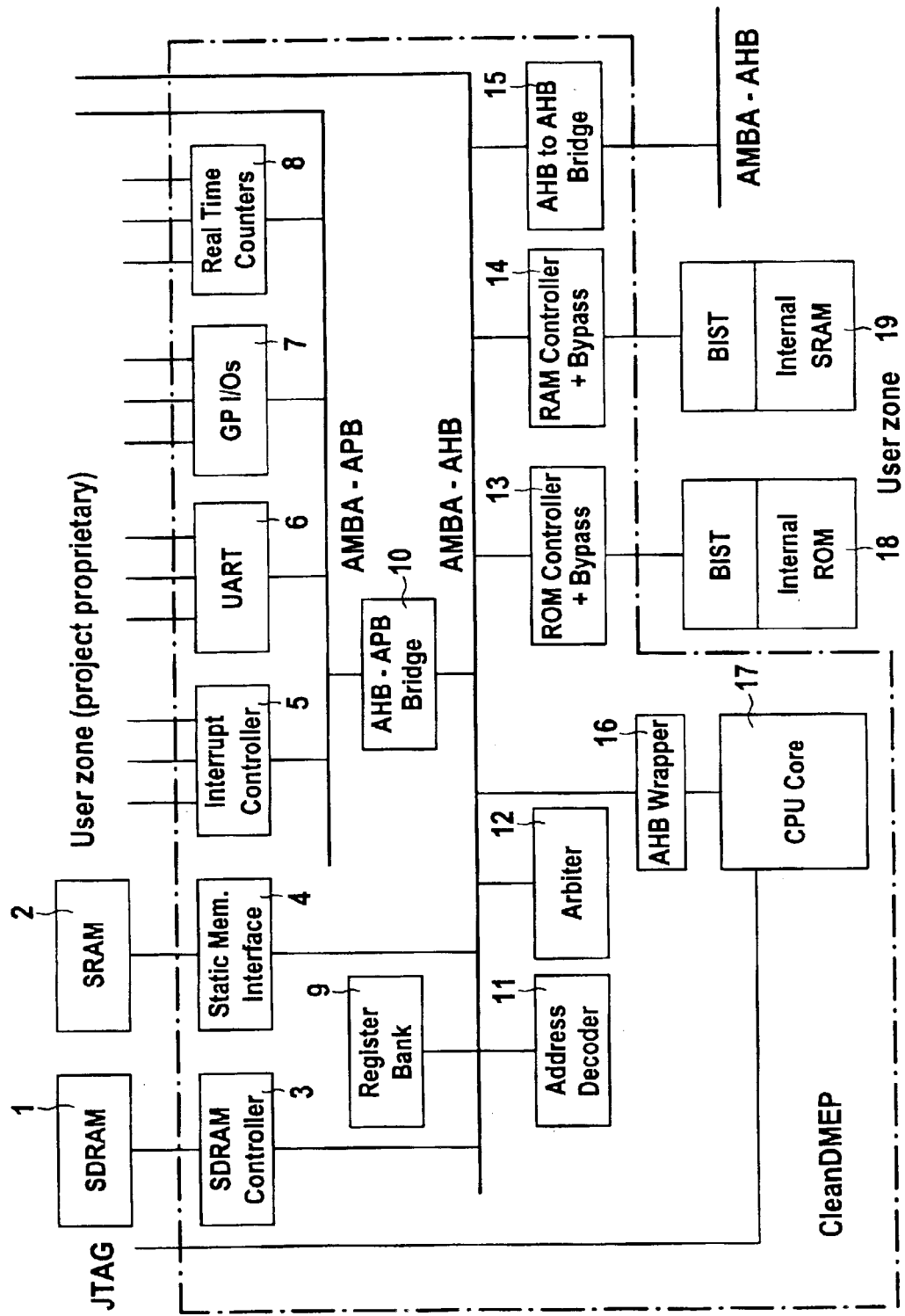

INTEGRATED CIRCUIT

TECHNICAL FIELD

The invention relates to an integrated circuit. The invention is based on a priority application EP 01 440 276.1 which is hereby incorporated by reference.

BACKGROUND OF THE INVENTION

Integrated circuits are implemented e.g. as system-on-chip on an ASIC; ASIC=Application Specific Integrated Circuit. An ASIC comprises special circuits, which are tailored to customers' wishes. These perform specific tasks. In telecommunications, for example, they are used for processing VoIP signals, DSL, ATM, SDH, SONET, UMTS, GSM, LMDS or ISDN signals; VoIP=Voice over Internet Protocol, DSL=Digital Subscriber Line, ATM=Asynchronous Transfer Mode, SDH=Synchronous Digital Hierarchy, SONET=Synchronous Optical Network, UMTS=Universal Mobile Telecommunication System, GSM=General System Mobile, LMDS=Local Multipoint Digital System, ISDN=Integrated Services Digital Network. They thus serve for processing speech, data, video, Internet web pages, etc.

An integrated circuit has e.g. a special processor platform for implementing general but also application-specific tasks. This processor platform can be used for any applications; the same processor platform for example in DSL chips, ATM chips etc. It includes a processor and supplies computing capacity.

The processor platform has several components, some components being connected to a fast AMBA-AHB bus, e.g. a processor, a ROM controller, a RAM controller, and other components being connected to a slow AMBA-APB bus, e.g. an interrupt controller, a real time counter; ROM=Read Only Memory, RAM=Random Access Memory. The question of which component is connected to which bus depends on the access speed, the processing speed and the frequency of use of the component.

For some components, such as the ROM controller and the RAM controller, which are hereinafter referred to as modules, address ranges comprising several addresses should be assigned. For each module, a predetermined address range within an address space is reserved before start-up. In addition, one address range is dual-assigned, for the ROM controller on the one hand and the RAM controller on the other hand. Memory management allocates the additionally specified address range to the ROM controller in the first place. If the address range is no longer needed for the ROM controller, e.g. after the boot operation, a one-time switch occurs to transfer the specified address range to the RAM controller.

SUMMARY OF THE INVENTION

It is the object of the invention to optimise the allocation of address ranges.

This object is achieved with an integrated circuit, in particular a system-on-chip, comprising a special processor platform with a processor, at least two modules and an address management, which are linked together via a bus, the address management being suitable for executing a variable assignment of different address ranges of an address space to at least two of the at least two modules integrated circuit. Since the address ranges in the address space are selectable, the usage of the address space capacity can be optimised according to the current load factor. Flexible usage of the address space is enabled by choosing the position of the address range to be selected and the size of the address range. The address range can be assigned automatically by a software program. The software program is for example designed in such a way that it executes a fair distribution of the address ranges to the existing modules or those modules that currently need an address range. Provided there are no overlaps with other address ranges, the address ranges to be assigned can be chosen as wished. User-specific programming can be used to allocate specific address ranges to individual modules.

A special Pause and Reset module is no longer needed for the boot operation. In the absence of flexible address management, this module is essential for enabling the switch from ROM to RAM during the boot operation.

Advantageous developments can be taken from the dependent claims and the subsequent description.

BEST MODE FOR CARRYING OUT THE INVENTION

The invention is explained hereinafter on the basis of an embodiment and with the help of a FIGURE.

The FIGURE shows a schematically represented detail of an integrated circuit according to the invention.

The detail shows a processor platform identified as CleanDMEP and several modules connected to the processor platform; CleanDMEP=Clean Design Methodology for Embedded Processors. The processor platform is a general platform and can be used for any processing, e.g. in telecommunications, in mechanical engineering, in aerospace, etc.; in telecommunications for example for all forms of XDSL, for UMTS, VoIP, etc.

The integrated circuit is implemented e.g. as system-on-chip on an ASIC. It comprises on the one hand the special processor platform with a processor 17, three AHB master and/or slave modules 3, 13, 14 and a central address management 11, which are linked together via a bus AMBA-AHB. Module 3 is e.g. implemented as a SDRAM controller, module 13 as a ROM controller and module 14 as a RAM controller. The address management 11 includes the three address ranges for the three modules 3, 13, 14. The bus is e.g. designed as a fast bus, e.g. as AMBA-AHB bus.

An address space with a preset capacity is provided. The address space has for example a size of 4 Gbytes. For a ROM, for example, 32 Kbytes are required. These 32 Kbytes can now be moved as wished in the 4 Gbyte address space. The move is effected by physical transfer of the addresses. For ROM and RAM, for example, 32 Kbytes each are provided. So long as the two 32-Kbyte address ranges do not overlap, their position within the 4 Gbyte address space can be chosen at will.

The address management 11 is suitable for performing a variable assignment of different address ranges of an address space to at least two modules.

Both the position of an address range within the address space and also the size of the address range can be chosen by a software program on the processor 17 and the address management 11. The software program is e.g. programmed in the programming language C or C++. The software program independently chooses the position and the size of an address range. Initially for example the size is calculated using a table stored for each module, containing the module ID and required size of address range. A suitable position for an address range of the required size is then determined. By scanning the address space, which is characterized by reserved and unreserved areas, e.g. by a correspondingly set or unset bit, a free address range of the required size is found. The first address range found in the required size is selected and reserved, and allocated to the module. If no free address range of the required size is found in the scanning, a redistribution of the reserved address ranges is performed. Gaps, i.e. unreserved areas between reserved address ranges, are closed by moving reserved address ranges. After the redistribution, all still unreserved addresses are moved to the rear of the address space. If an address range of the required size is now available in this rear address space, then it is reserved and allocated. If there is still no address range available in the required size, the program checks whether a smaller address range size is possibly stored in the table for the relevant module. One, two or more address range sizes can e.g. be stored in the table for each module. If there is a low traffic load on the AMBA-AHB bus or if a small number of protected ranges is present, then the larger address range sizes are chosen; for a greater traffic load or a large number of protected ranges, the smaller. This increases the processing speed. If an address range of the required smaller size is present in the address space, this is selected, reserved and allocated. If an address range of the required smaller size is not present in the address space, the address sizes of the previously reserved address ranges are successively reduced by selection via the table, until a corresponding address range of the required smaller size is unreserved. This is then allocated. The size of the address space is e.g. designed such that all modules can be allocated an address range of at least the smallest size.

By means of a special software program and a GUI (Graphical User Interface), a user can decide the initial reservation of individual address ranges. E.g. a larger address space should be available for a SDRAM controller than for a RAM controller. This can be specified by the user. The user can program individual address space configurations, e.g. tailored to the particular topology of a specific processor platform.

Furthermore, at least one component 5, 6, 7, 8 is e.g. provided, which is connected via an AMBA-APB bus and a bridge 10 to the AMBA-AHB bus. The address management 11 is optionally suitable for executing a variable assignment of different address ranges of the address space to at least one component 5, 6, 7, 8.

The general structure of the processor platform is explained hereinafter.

The processor platform contains a SDRAM controller 3, which is connected on the one hand to the fast internal bus AMBA-AHB, and on the other hand to a SDRAM 1 that is internal but arranged outside the processor platform. Internal means within the integrated circuit, external outside the integrated circuit. Module 3, implemented as a SDRAM controller, controls the access to the SDRAM 1 and performs the necessary conversion on the bus protocol. The SDRAM 1 can also be arranged outside the integrated circuit, i.e. externally.

The processor platform further contains a static memory interface 4, which is connected on the one hand to the fast internal bus AMBA-AHB and on the other hand to a SRAM 2 that is internal but arranged outside the processor platform. The static memory interface 4 controls the access to the SRAM 2 and performs the necessary conversion on the bus protocol. The SRAM 2 can also be arranged outside the integrated circuit, i.e. externally.

Also provided is an interrupt controller 5, which on the one hand is connected to a slow internal bus e.g. implemented as AMBA-APB, and on the other hand presents at least one interface to a module that is internal or external but arranged outside the processor platform. The interrupt controller 5 serves to connect interrupts from modules outside the platform to the processor.

Also provided is a UART 6, which on the one hand is connected to the slow internal AMBA-APB bus, and on the other hand presents an interface to an external host processor that is arranged outside the processor platform. The UART 6 serves for transferring data between the external host processor and the internal processor (17).

Also provided is a GP I/O 7, which on the one hand is connected to the slow internal AMBA-APB bus, and on the other hand presents at least one interface to a module that is internal or external but arranged outside the processor platform. The GP I/O 7 serves to transfer control information between modules outside the platform and the internal processor 17; GP I/O=General Purpose In/Out.

Also provided is a real time counter 8, which on the one hand is connected to the slow internal AMBA-APB bus, and on the other hand presents at least one interface to a module that is internal or external but arranged outside the processor platform. The real time counter 8 serves as a timer, which runs with the system clock.

A register bank 9 is further provided, which is connected to the fast AMBA-AHB bus. The register bank 9 supplies registers for several modules, including e.g. module 14, implemented as RAM controller and module 3, implemented as SDRAM controller.

An arbiter 12, which is connected to the fast AMBA-AHB bus, serves in the case of simultaneous access by several masters to the fast bus, to prioritise these accesses and process them in the prioritised order.

The processor 17 is implemented e.g. as a microprocessor or as a digital signal processor. It may be connected via an AHB wrapper to the fast AMBA-AHB bus. The AHB wrapper 16 performs the necessary conversions of the protocols as required.

Module 13 is e.g. as a ROM controller, which is connected on the one hand to the fast AMBA-AHB bus, and on the other hand to an internal ROM 18 arranged outside the processor platform, which ROM can also contain a BIST; BIST=Build-In Self Test.

The ROM controller controls the access to the internal ROM 18, and performs the necessary conversion on bus protocol.

Module 14, implemented as a RAM controller, is connected on the one hand to the fast internal bus AMBA-AHB and on the other hand to a SRAM 19 that is internal but arranged outside the processor platform. The RAM controller controls the access to the SRAM 19, and performs the necessary conversion on bus protocol. The SRAM 19 can also contain a BIST.

A bridge 10 is also provided. Bridge 10 connects the fast AMBA-AHB bus to the slow AMBA-APB bus. A connection between the modules connected to the AMBA-AHB bus and the modules connected to the AMBA-APB bus is thus established over the bridge 10. Processor 17 thus has e.g. access over bridge 10 to the interrupt controller 5. The apportionment with two buses with different processing speeds has the advantage that slow accesses do not impede fast accesses. Bridge 10, AMBA-APB bus and the modules connected to it are optional. If the functionalities of the modules are not needed, they and the AMBA-APB bus, and bridge 10, can be omitted from the design, leading to a saving of space and reduction of manufacturing costs.

Processor 17 has a connection to a JTAG=Joint Test Action Group. The JTAG interface can be used for debugging the SW on the internal processor, but also during the ASIC production control.

The AMBA-APB bus can be continued internally outside the processor platform, and if applicable also externally, outside the integrated circuit.

The AMBA-AHB bus can be continued internally outside the processor platform, and if applicable also externally, outside the integrated circuit.

The embodiment represents one specific processor platform. The invention can be applied to any processor platform, in particular a processor platform with fewer or more elements than those shown in the FIGURE. The integrated circuit can also present more than one processor, more than one control input and more than one external memory. If for example two processors are managed through a common address management, one control input and one external memory can be sufficient for both processors. As well as the special processor platform, further processors and modules can also be arranged on the integrated circuit, and also make up the greater part of the integrated circuit, e.g. 80%, so that e.g. only 20% is allotted to the processor platform. The integrated circuit can also contain two or more processor platforms.

In the embodiment the modules are implemented as ROM, RAM and SDRAM controllers. A module can e.g. also be implemented as a DRAM, PROM, EPROM or EEPROM; PROM=Programmable ROM, EPROM= Erasable PROM, EEPROM=Electrically EPROM.

In the embodiment, chip-internal AMBA buses are used, and chip-external AMBA buses and/or a PCI bus. It is also possible to use chip-internally e.g.: CoreConnect bus, CoreFrame bus, FISPbus or IPbus. It is also possible to use chip-externally e.g.: VMEbus, USB bus, etc. Instead of one or two buses for chip-internal connection of the components, three or more buses can also be used, e.g. an extra bus for the linking of the arbiter to several components. The processors are implemented as ARM, Intel or AMD processors, for example.

Abbreviations:

AMBA=Advanced Micro-controller Bus Architecture,

AHB=Advanced High-performance Bus,

APB=Advanced Peripheral Bus,

ARM=Advanced RISC Machine,

VHDL=VHSIC Hardware Description Language.

What is claimed is:

1. An integrated circuit comprising a processor platform which comprises a processor, at least first and second modules and an address management unit, which are linked together via a bus, the address management unit being configured to perform a variable assignment of different continuous, non-overlapping address ranges of an address space to the first and second modules by scanning the address space to find a free address range of a required size for each of the first and second modules, wherein if no free address range of the required size is found in the scanning, a redistribution of reserved address ranges is performed to create the free address range of the required size.

2. The integrated circuit according to claim 1, wherein both the position of an address range within the address space and also the size of the address range are determined by a software program on the processor or the address management unit.

3. The integrated circuit according to claim 1, wherein at least one of the first and second is implemented as a controller.

4. The integrated circuit according to claim 1, wherein the first module is implemented as a ROM controller, the second module is implemented as a RAM controller, and a third module is implemented as a SDRAM controller.

5. The integrated circuit according to claim 1, wherein the bus is implemented as an Advanced Micro-controller Bus Architecture—Advanced High-performance Bus (AMBA-AHB) bus.

6. The integrated circuit according to claim 5, wherein the processor is connected via an AHB wrapper to the AMBA-AHB bus.

7. The integrated circuit according to claim 6, wherein in the processor platform at least one component is provided, which is linked via an Advanced Micro-controller Bus Architecture—Advanced Peripheral Bus (AMBA-APB) bus and a bridge to the AMBA-AHB bus, and that the address management is suitable for executing a variable assignment of different address ranges of the address space to at least one of the at least one component.

8. The integrated circuit according to claim 1, wherein after the redistribution of reserved address ranges is performed, if there is still no address range available in the required size, address sizes of previously reserved address ranges are successively reduced to create the free address range.

* * * * *